(12) United States Patent
Ishigami (10) Patent No.: US 7,033,033 B2
(45) Date of Patent: Apr. 25, 2006

(54) MIRROR DEVICE FOR A VEHICLE

(75) Inventor: Narumi Ishigami, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 86 days.

(21) Appl. No.: 10/609,658

(22) Filed: Jul. 1, 2003

(65) Prior Publication Data

US 2004/0021962 A1    Feb. 5, 2004

(30) Foreign Application Priority Data

Jul. 2, 2002    (JP) ............................. 2002-192886

(51) Int. Cl.
*G02B 7/182*    (2006.01)
(52) U.S. Cl. ...................... 359/872; 248/476
(58) Field of Classification Search ................ 359/872, 359/873, 874, 876, 877; 248/476, 479, 487
See application file for complete search history.

(56) References Cited

U.S. PATENT DOCUMENTS

| | | | | |
|---|---|---|---|---|
| 4,867,408 | A * | 9/1989 | Ozaki ......................... | 248/483 |
| 5,313,336 | A | 5/1994 | Sakao et al. | |
| 5,604,645 | A * | 2/1997 | Weaver ....................... | 359/877 |
| 5,781,353 | A * | 7/1998 | Seubert et al. .............. | 359/841 |
| 6,347,872 | B1 * | 2/2002 | Brechbill et al. ........... | 359/879 |
| 6,550,924 | B1 * | 4/2003 | Romas ........................ | 359/841 |
| 6,685,324 | B1 * | 2/2004 | Apfelbeck .................. | 359/872 |
| 6,830,352 | B1 * | 12/2004 | Lang et al. ................. | 359/872 |

FOREIGN PATENT DOCUMENTS

| | | |
|---|---|---|
| DE | 201-17-559-U 1 | 2/2002 |
| EP | 0-535-993 A1 | 4/1993 |
| EP | 1-170-174 A2 | 1/2002 |
| EP | 1-170-174 A3 | 1/2002 |
| WO | WO-00/69685 | 11/2000 |

OTHER PUBLICATIONS

Preliminary Search Report dated Aug. 26, 2004, for French Patent Application No. 0307905000.

* cited by examiner

*Primary Examiner*—Mark A. Robinson
*Assistant Examiner*—Alessandro Amari
(74) *Attorney, Agent, or Firm*—Nixon Peabody LLP (57) ABSTRACT

In order to eliminate use of assembling equipment for assembling a holding member to a supporting member, a mirror device for a vehicle, having the holding member which holds a mirror and the supporting member which is connected to a vehicle body and assembled with the holding member, comprising an engage-member provided in one of the holding member or the supporting member, the engage-member having elasticity in a first direction and having rigidity in a second direction, and an engagement claw provided in the other of the holding member and the supporting member, the engagement claw having a protruding portion, wherein the holding member is assembled to the supporting member by the protruding portion of the engagement claw being engaged with the engage-member in the second direction due to that the protruding portion causes the engage-member to elastically deform in the first direction, and passes over the engage-member, is provided.

16 Claims, 6 Drawing Sheets

FIG. 2

← VEHICLE REAR    VEHICLE FRONT →

MIRROR DEVICE FOR A VEHICLE

CROSS-REFERENCE TO RELATED APPLICATION

This application claims priority under 35 USC 119 from Japanese Patent Application No. 2002-192886, the disclosure of which is incorporated by reference herein.

BACKGROUND OF THE INVENTION

1. Field of the Invention

The present invention relates to a mirror device for a vehicle, which is equipped with a mirror for visualizing rearward.

2. Description of the Related Art

A door mirror device for a vehicle is provided with, for example, a door mirror stay. The door mirror stay is fixed to a vehicle door. The door mirror stay supports a door mirror visor and the door mirror visor is connected to a vehicle body via the door mirror stay.

A mirror surface angle adjustment mechanism is assembled to the door mirror visor, and a mirror for visualizing rearward is assembled to the mirror surface angle adjustment mechanism. As a result, the mirror is held by the mirror surface angle adjustment mechanism and is supported by the door mirror visor via the mirror surface angle adjustment mechanism. Further, the surface angle of the mirror is adjusted in such a manner that the mirror is tilted by the mirror surface angle adjustment mechanism.

In the door mirror device for a vehicle, the mirror can be removed from the mirror surface angle adjustment mechanism for the purpose of repair or replacement in such a manner as to be pulled to the opposite side of the mirror surface angle adjustment mechanism. Further, when the mirror is removed from the mirror surface angle adjustment mechanism, it is necessary to prevent the mirror surface angle adjustment mechanism from being separated from the door mirror visor. For this reason, the mirror surface angle adjustment mechanism needs to be mounted to the door mirror visor by a large mounting (fastening) force. Accordingly, the mirror surface angle adjustment mechanism is mounted to the door mirror visor by screw fastening or so-called plug press fitting.

However, in the assembling using the above-described screw fastening, a jig or tool is required. Accordingly, there arises a problem in which assembling equipment used for mounting (assembling) the mirror surface angle adjustment mechanism to the door mirror visor is needed.

Further, in the assembling using the plug press fitting, in order to reliably obtain a large mounting force, high-precision management of plug press fitting force and high-precision of resin molding of a plug-shape are required. Accordingly, there arises a problem in that it is hard to manufacture a structure for mounting the mirror surface angle adjustment mechanism to the door mirror visor.

SUMMARY OF THE INVENTION

In view of the above-described circumstances, it is an object of the present invention to provide a mirror device for a vehicle, which can eliminate the use of assembling equipment for mounting a holding member to a supporting member and which can facilitate the production of a structure for mounting the holding member to the supporting member.

A first aspect of the invention is a mirror device for a vehicle, having a holding member which holds a mirror for visualizing rearward, and a supporting member which is connected to a vehicle body and which is assembled with the holding member, the supporting member supporting the mirror via the holding member, the device comprising: an engage-member provided in one of the holding member or the supporting member, the engage-member having elasticity in a first direction and having rigidity in a second direction; and an engagement claw provided in the other of the holding member or the supporting member, the engagement claw having a protruding portion, wherein the holding member is assembled to the supporting member by the protruding portion of the engagement claw being engaged with the engage-member in the second direction due to that the protruding portion causes the engage-member to elastically deform in the first direction, and passes over the engage-member.

In a second aspect according to the first aspect, the device further comprises an engagement hole provided in one of the holding member or the supporting member; and an engagement protrusion provided in the other of the holding member or the supporting member, the engagement protrusion being engaged with the engagement hole when the holding member is assembled to the supporting member.

In a third aspect according to the first aspect, when the holding member is assembled to the supporting member, the supporting member presses the holding member toward the supporting member, thereby allowing the holding member to abut on the supporting member.

A fourth aspect of the present invention is a mirror device for a vehicle, having a holding member which holds a mirror for visualizing rearward, and a supporting member which is connected to a vehicle body and which is assembled with the holding member, the supporting member supporting the mirror via the holding member, the device comprising: an engage-member provided in one of the holding member or the supporting member, the engage-member having elasticity in a first direction and having rigidity in a second direction; and an engagement claw provided in the other of the holding member or the supporting member, wherein the holding member is assembled to the supporting member by the engagement claw being engaged with the engage-member in the second direction after the engage-member is elastically deformed by the engagement claw in the first direction.

In a fifth aspect according to the fourth aspect, the first direction is a direction perpendicular to an assembling direction of the holding member and the supporting member, and the second direction is parallel to the assembling direction.

In a sixth aspect according to the fourth aspect, the engage-member is formed such that a plate-shape member is bent in a substantially U-form, and a central portion of the plate-shape member is engaged with a protrusion formed on the engagement claw.

In a seventh aspect according to the fourth aspect, the device further comprises an engagement hole provided in one of the holding member or the supporting member; and an engagement protrusion provided in the other of the holding member and the supporting member, the engagement protrusion being engaged with the engagement hole when the holding member is assembled to the supporting member.

In an eighth aspect according to the fourth aspect, a predetermined gap is formed between the engagement claw and the engage-member in a state in which the engagement protrusion is engaged with the engagement hole.

In a ninth aspect according to the seventh aspect, the engagement protrusion has protrusions on a tip end thereof, and the engagement hole is a tube-shape.

In a tenth aspect according to the seventh aspect, the engagement protrusion is a plate-shape member, and the engagement hole is formed by a pair of plate-shape members.

In an eleventh aspect according to the seventh aspect, the engage-member and the engagement hole are formed on a single member.

In a twelfth aspect according to the eleventh aspect, the single member is a tube-shape member, and a pair of slits are formed on the tube-shape member so as to have elasticity in the first direction.

In a thirteenth aspect according to the seventh aspect, the engagement claw and the engagement protrusion are formed on a single member.

In a fourteenth aspect according to the thirteenth aspect, the single member is a protruding member having protrusions on a tip end thereof.

In the mirror device for a vehicle according to the first and fourth aspects of the present invention, the mirror for visualizing rearward is held by the holding member. The supporting member supports the mirror via the holding member in such a manner that the holding member is assembled to the supporting member connected to the vehicle body.

The engage-member provided in one of the holding member and the supporting member has elasticity in the first direction and also has rigidity in the second direction. Further, the engagement claw provided in the other of the holding member and the supporting member has the protruding portion. The protruding portion elastically deforms the engage-member in the first direction in order to pass over (ride over) the engage-member. After the protruding portion passes over, elastic deformation of the engage-member by the protruding portion is released and the protruding portion of the engagement claw is engaged with the engage-member in the second direction, thereby resulting in the holding member being assembled to the supporting member.

In this manner, the engagement claw is engaged with the engage-member after elastic deformation of the engage-member by the protruding portion in the first direction, thereby allowing the holding member to be assembled to the supporting member. Accordingly, the use of a conventional jig or tool can be eliminated, and assembling equipment for assembling the holding member to the supporting member can be made unnecessary. Further, elastic deformation of the engage-member by the protruding portion of the engagement claw can be achieved by a low power (low load). Therefore, an operation of assembling the holding member to the supporting member can be facilitated.

Moreover, since the engage-member has rigidity in the second direction as is described above, the engagement claw is engaged with the engage-member at the protruding portion of the engagement claw in the second direction, thereby allowing the holding member to be assembled to the supporting member by a large assembling force. Accordingly, only with a structure in which the engage-member has elasticity in the first direction and has rigidity in the second direction, the holding member can be assembled to the supporting member by a large assembling force. Further, high-precision management of the strength of the engage-member and/or high-precision formation of the shape of the engage-member is not required. As a result, production of an assembling structure for assembling the holding member to the supporting member can be facilitated.

In the mirror device for a vehicle according to the second and seventh aspects of the present invention, when the holding member is assembled to the supporting member, the engagement protrusion provided in the other of the holding member and the supporting member is engaged with the engagement hole provided in one of the holding member and the supporting member. Accordingly, the engagement claw is guided to the engage-member and can reliably be engaged therewith, and the holding member can reliably be assembled to the supporting member. Further, the holding member can be positioned in the supporting member, and looseness of the holding member with respect to the supporting member in a direction perpendicular to the engagement hole and the engagement protrusion can be prevented.

Further, each of the members can be formed in accordance with the sixth, ninth, tenth, eleventh, twelfth, thirteenth and fourteenth aspects.

In the mirror device for a vehicle according to the third aspect of the present invention, when the holding member is assembled to the supporting member, the holding member is made to abut on the supporting member in such a manner the holding member is pressed by the supporting member toward the supporting member. For example, the engage-member presses the protruding portion of the engagement claw. As a result, looseness of the holding member with respect to the supporting member, toward the supporting member side and the opposite side, can be prevented.

Further, in a case in which the supporting member presses the holding member toward the supporting member by means of members other than the engage-member and the protruding portion of the engagement claw, even if the engage-member and the protruding portion are not abutted on each other, looseness of the holding member toward supporting member side and opposite side can be prevented. Accordingly, a space can be formed between the protruding portion and the engage-member, and the protruding portion can reliably pass over the engage-member. Further, it is not necessary that the engage-member and the engagement claw (including the protruding portion) may be formed into high-accurate sizes, and the engage-member and the engagement claw can be formed in a simple manner.

BRIEF DESCRIPTION OF THE DRAWINGS

FIGS. 3A, 3B and 3C show diagrams each representing an engage-member and an engagement claw in the door mirror device for a vehicle according to the first embodiment of the present invention.

FIGS. 4A and 4B show diagrams each representing an insert protrusion and an insertion cylinder in the door mirror device for a vehicle according to the first embodiment of the present invention.

FIGS. 6A and 6B show diagrams each representing an insert protrusion and an insertion cylinder in a door mirror device for a vehicle according to a second embodiment of the present invention.

DETAILD DESCRIPTION OF THE INVENTION

FIRST EMBODIMENT

Figure 1:
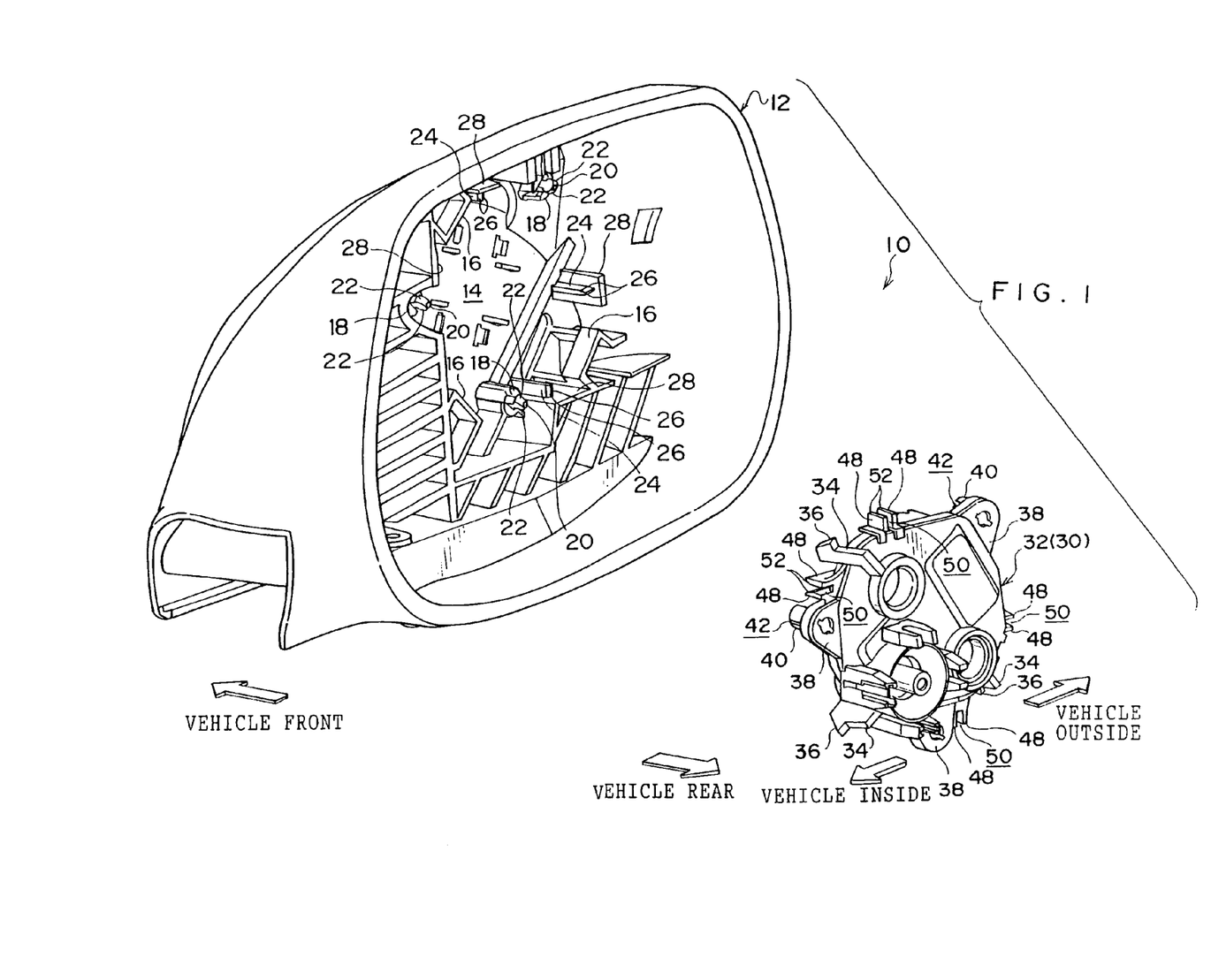
FIG. 1 is an exploded perspective view showing a principal portion of a door mirror device for a vehicle according to a first embodiment of the present invention.
Figure 2:
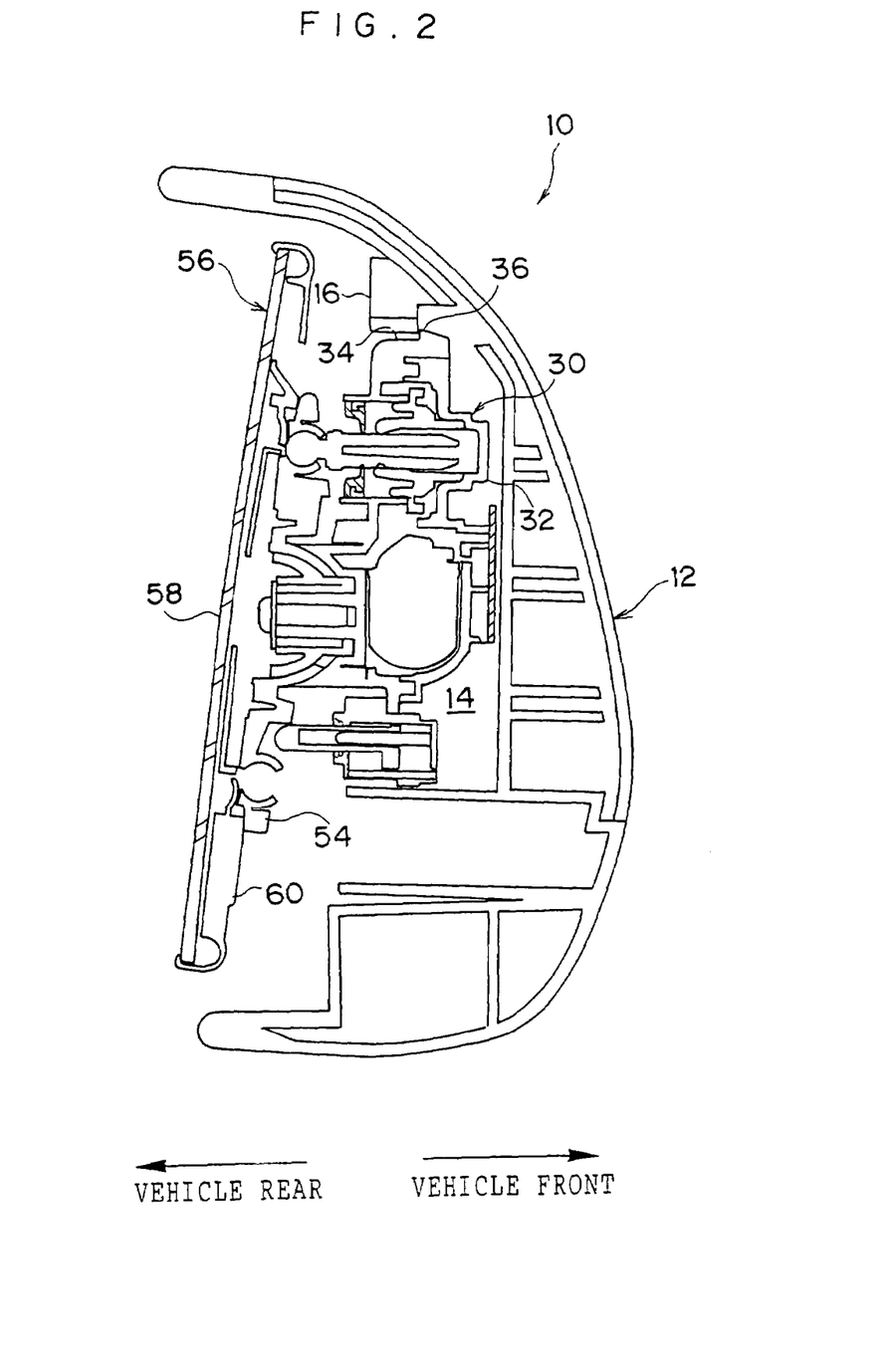
FIG. 2 is a cross-sectional view showing the door mirror device for a vehicle according to the first embodiment of the present invention.

An exploded perspective view of a principal portion of a door mirror device 10 for a vehicle according to a first embodiment, to which a mirror device for a vehicle of the present invention is applied, is shown in FIG. 1. A cross-sectional view of the door mirror device 10 for a vehicle is shown in FIG. 2.

The door mirror device 10 for a vehicle according to the present embodiment is provided with a door mirror stay (not shown in the drawings), and the door mirror stay is fixed to a vehicle door (not shown in the drawings). A housing mechanism (not shown in the drawings) is supported by the door mirror stay, and a door mirror visor 12 serving as a supporting member is fixed to the housing mechanism. As a result, the door mirror visor 12 is connected to a vehicle body via the housing mechanism and the door mirror stay. Further, the door mirror visor 12 is formed in the shape of a box having an opening, the opening being formed at the vehicle rear side of the door mirror visor 12. Moreover, the housing mechanism is accommodated in a vehicle-inside portion in the door mirror visor 12.

A rectangular parallelepiped assembling portion 14, whose shape is a square when seen from the front, is formed at a central position in the vehicle inside-outside direction (in the vehicle left-and-right direction) in the door mirror visor 12, and is provided in a region from the upper position to the intermediate position in the vertical direction of the door mirror visor 12. The assembling portion 14 is further recessed toward the front side of the vehicle with respect to adjacent portions of the assembling portion 14.

Figure 3A:
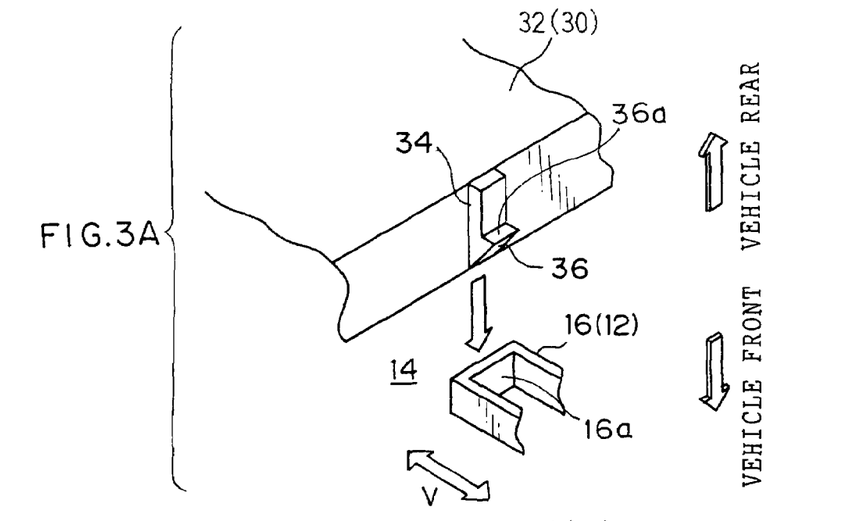
FIG. 3A is a perspective view showing a state before the engage-member and the engagement claw are engaged with each other.

A predetermined number of (in the present embodiment, three) plate-shaped engage-members 16 are provided in the outer periphery of the assembling portion 14, and these engage-members 16 are arranged in the circumferential direction of the assembling portion 14 substantially at regular intervals (at the same intervals). As is shown in FIG. 3A in detail, each engage-member 16 is bent so as to have a substantially U-shaped configuration, and a central portion 16a of each engage-member 16 is directed toward a center of the assembling portion 14. As a result, the central portion 16a of each engage-member 16 has elasticity in a surface-vertical direction V (the surface vertical direction V is perpendicular to the longitudinal (front-rear) direction of the vehicle (assembling direction)) and has rigidity in a surface-parallel direction (the surface-parallel direction is the longitudinal direction of the vehicle).

A predetermined number of (in the present embodiment, three) columnar abut-pillars 18 are provided in the outer periphery of the assembling portion 14, and each abut-pillar 18 protrudes to rearward of the vehicle. Each abut-pillar 18 is disposed between adjacent engage-members 16. A predetermined number of abut-pillars 18 are arranged in the circumferential direction of the assembling portion 14 at regular intervals.

Figure 4A:
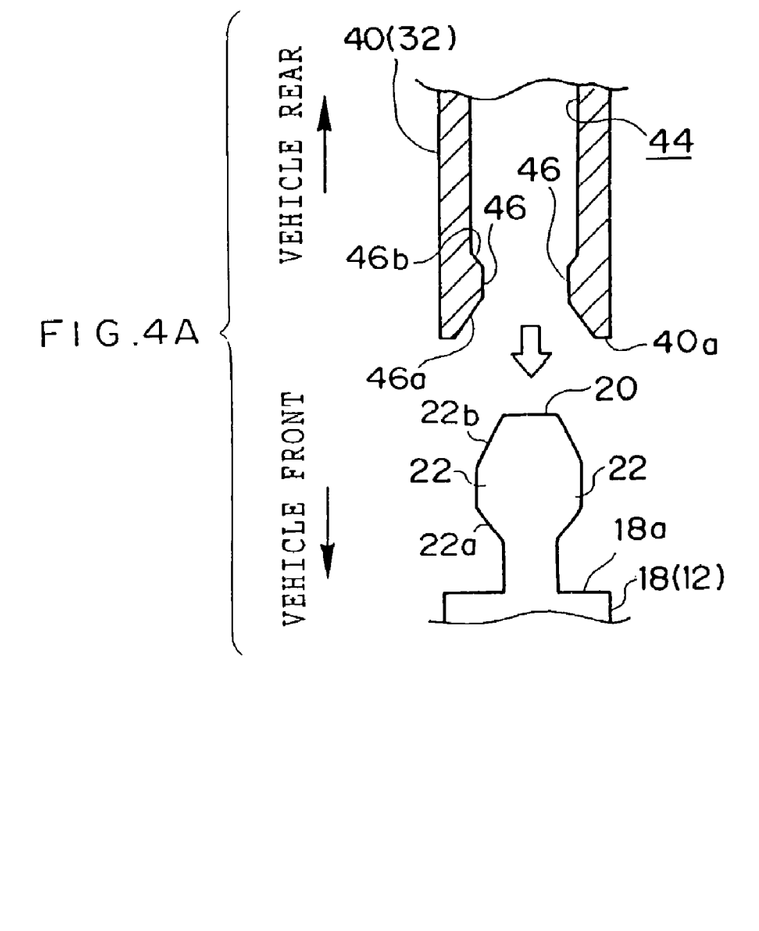
FIG. 4A is a partially cutaway side view showing a manner in which the insert protrusion is inserted in the insertion cylinder.

As is shown in FIG. 4A in detail, a flat plate-shaped insert-protrusion 20, which serves as an engagement protrusion, is provided on a vehicle-rear-side surface of each abut-pillar 18, and each insert protrusion 20 protrudes from each abut-pillar 18 to rearward of the vehicle. A pair of latching portions 22 are provided at a rear side end portion of each insert protrusion 20, and the pair of latching portions 22 protrude from the insert protrusion 20 respectively to opposite sides in direction perpendicular to the longitudinal direction of the vehicle. Each latching portion 22 protrudes from the insert protrusion 20 so as to have a trapezoidal or triangular cross-sectional configuration. A vehicle front side surface 22a and a vehicle rear side surface 22b of each latching portion 22 are each formed as a planar inclined surface.

Figure 5:
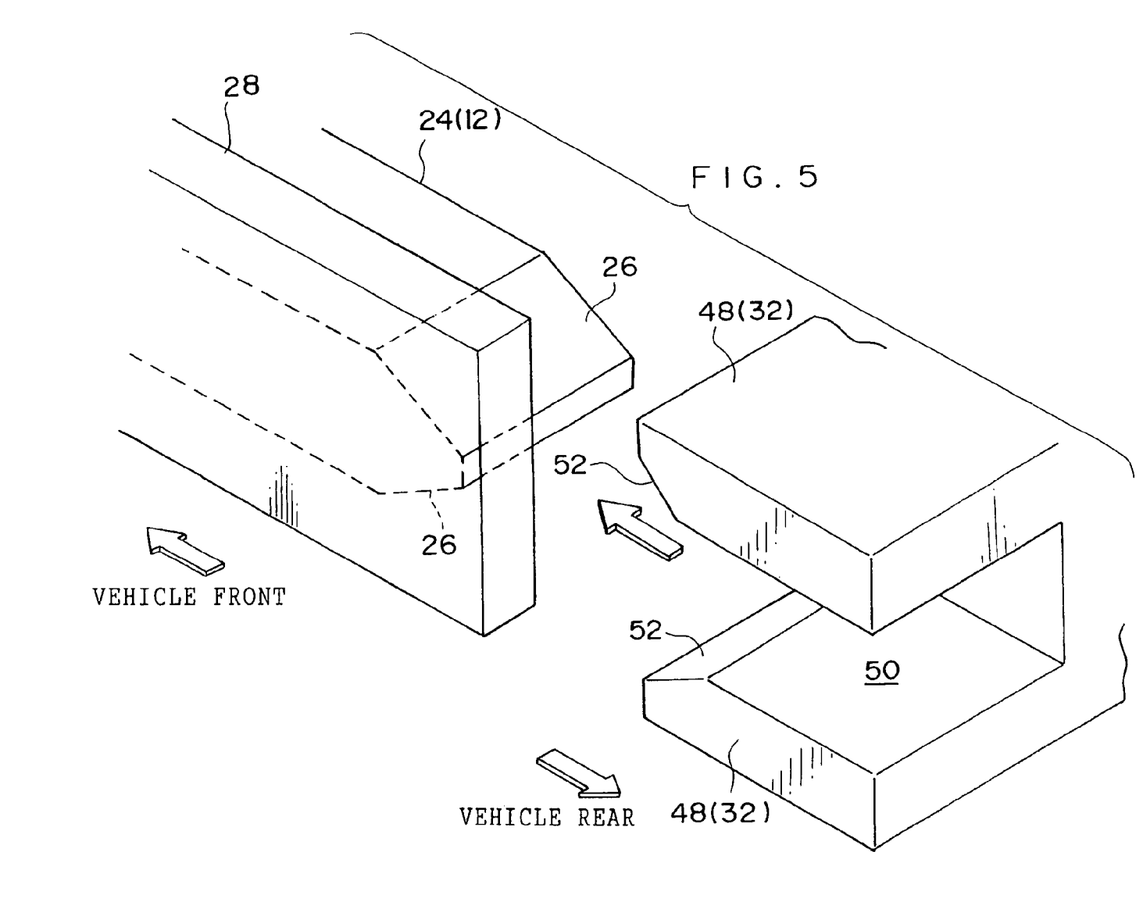
FIG. 5 is a perspective view showing a manner in which an engage-plate is fitted into an engagement hole in the door mirror device for a vehicle according to the first embodiment of the present invention.

A predetermined number of (in the present embodiment, four) elongated plate-shaped engage-plates 24, each serving as an engagement protrusion, are provided in the outer periphery of the assembling portion 14, and each engage-plate 24 protrudes to rearward of the vehicle and is disposed perpendicular to the outer periphery of the assembling portion 14. As shown in FIG. 5 in detail, a pair of inclined surfaces 26 are formed at a vehicle rear side end of each engage-plate 24. Each inclined surface 26 is formed as a flat surface, and the thickness of each engage-plate 24 gradually decreases to rearward of the vehicle due to the pair of inclined surfaces 26.

A predetermined number of (in the present embodiment, four) flat plate-shaped reinforcing plates 28 are provided in the outer periphery of the assembling portion 14. Each reinforcing plate 28 is disposed at the outer side of the assembling portion 14 with respect to respective engage-plate 24, and is formed integrally with each engage-plate 24 in a state of being made perpendicular to the engage-plate 24. As a result, the engage-plates 24 are each reinforced by the corresponding reinforcing plate 28.

A mirror surface angle adjustment mechanism 30 serving as a holding member is disposed in the door mirror visor 12. The mirror surface angle adjustment mechanism 30 has a mechanism main body 32. The mechanism main body 32 is formed as a rectangular parallelepiped which is substantially a square when seen from the front.

A predetermined number of (in the present embodiment, three) flat plate-shaped engagement claws 34 having rigidity are each provided at the outer periphery of the mechanism main body 32 so as to be formed integrally with the outer periphery of the mechanism main body 32. The predetermined number of engagement claws 34 are arranged in the circumferential direction of the mechanism main body 32 substantially at regular intervals, and each engagement claw 34 protrudes from the outer periphery of the mechanism main body 32 vertically. As is shown in FIG. 3A in detail, a protruding portion 36 is formed at the vehicle-front-side end of each engagement claw 34. Each protruding portion 36 protrudes from the corresponding engagement claw 34 to the outer side of the mechanism main body 32, and is formed so as to have a triangular or trapezoidal cross-sectional configuration. A vehicle-rear-side surface 36a of the protruding portion 36 is formed as a flat surface perpendicular to the longitudinal direction of the vehicle and a vehicle-front-side surface 36b thereof is formed as a planar inclined surface.

Figure 3B:
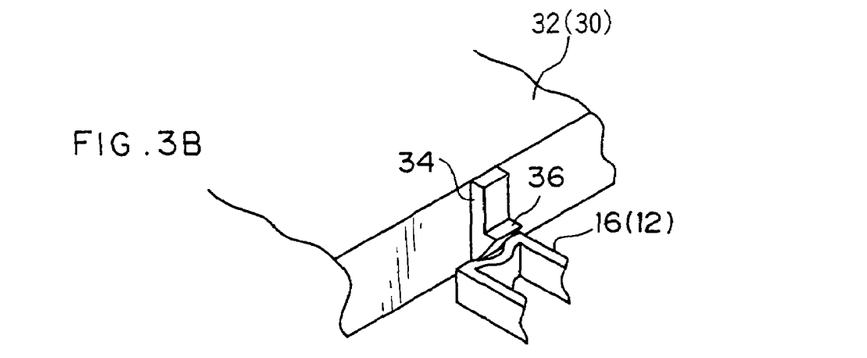
FIG. 3B is a perspective view showing a manner in which the engage-member and the engagement claw are engaged with each other.
Figure 3C:
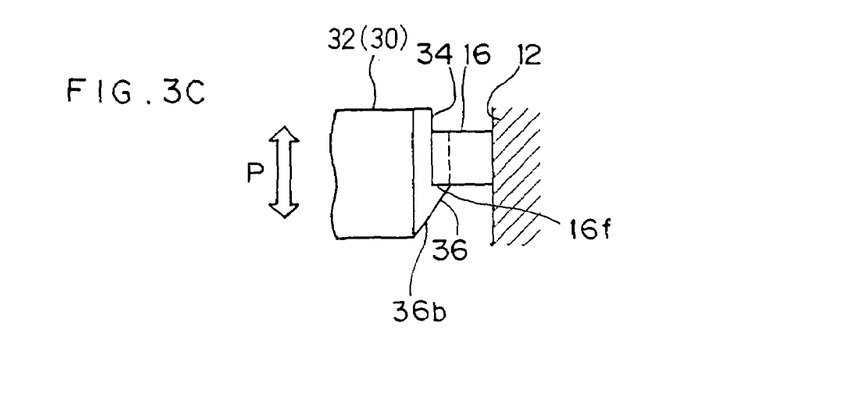
FIG. 3C is a side view showing a state in which the engage-member and the engagement claw are engaged with each other.

With the mirror surface angle adjustment mechanism 30 (mechanism main body 32) being moved close to the assembling portion 14 in the door mirror visor 12 in a facing state as shown in FIG. 3A, the central portion of each engage-member 16 is pushed by the vehicle-front-side surface 36b of each protruding portion 36 so as to elastically deform (bend) in the surface vertical direction, as is shown in FIG. 3B, thereby allowing each protruding portion 36 to ride over (pass over) the central portion 16a of each engage-member 16. Further, as is shown in FIG. 3C, after each protruding portion 36 passes over the central portion of each engage-member 16, elastic deformation of the central portion of each engage-member 16 by each protruding portion 36 is released by elastic force (restoring force), and the central portion of each engage-member 16 is positioned at the vehicle-rear-side with respect to the vehicle-rear-side surface 36a of each protruding portion 36. As a result, each engagement claw 34 (each protruding portion 36) is engaged (latched) with the central portion of each engage-member 16 in the surface parallel direction P, and movement of the mirror surface angle adjustment mechanism 30 to the opposite side of the door mirror visor 12 (to rearward of the vehicle) is prevented, thereby allowing the mirror surface angle adjustment mechanism 30 to be assembled to the door mirror visor 12.

A predetermined number of (in the present embodiment, three) protruding plates 38 having a substantially triangular configuration are formed in the outer periphery of the mechanism main body 32 integrally with the mechanism main body 32. The predetermined number of protruding plates 38 are arranged in the circumferential direction of the mechanism main body 32 at regular intervals, and each protruding plate 38 protrudes outwardly from the outer periphery of the mechanism main body 32.

A substantially cylindrical insertion cylinder 40 is formed at a vehicle-front-side surface of each protruding plate 38 so as to be integrally with the protruding plate 38. Each insertion cylinder 40 protrudes from the corresponding protruding plate 38 toward the front side of the vehicle. A pair of slits 42 are formed at a vehicle-front side end of each insertion cylinder 40, and slits 42 in each pair face each other. As a result, each insertion cylinder 40 can be made elastically deformable in direction in which the latching portions 22 of each insert protrusion 20 protrude. As shown in FIG. 4A in detail, an insertion hole 44 serving as an engagement hole is formed within each insertion cylinder 40. A pair of latching protrusions 46 are provided at an internal peripheral surface of a vehicle-front-side end of each insertion cylinder 40. The latching protrusions 46 in each pair face each other. Each latching protrusion 46 protrudes so as to have a trapezoidal or triangular cross-sectional configuration, and the vehicle-front-side surface 46a and vehicle-rear-side surface 46b of the latching protrusion 46 are each formed as a planar inclined surface.

Figure 4B:
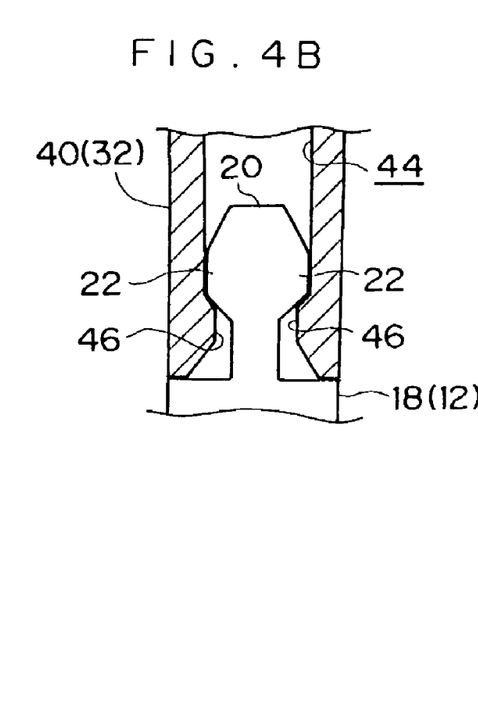
FIG. 4B is a partially cutaway side view showing a state in which the insert protrusion is inserted in the insertion cylinder.

When the mirror surface angle adjustment mechanism 30 (mechanism main body 32) is moved close to the assembling portion 14 in the door mirror visor 12 in a facing state, as shown in FIG. 4A, the vehicle-front-side surface 46a of each latching protrusion 46 is guided by the vehicle-rear-side surface 22b of each latching portion 22 by each insertion cylinder 40 being moved close to each insert protrusion 20, thereby allowing each insert protrusion 20 to be inserted in each insertion hole 44 (within each insertion cylinder 40). Further, after each latching protrusion 46 rides over (passes over) each latching portion 22 due to elastic deformation of each insertion cylinder 40, elastic deformation of each insertion cylinder 40 is, as shown in FIG. 4B, released by the elastic force (restoring force), and the internal peripheral surface of each insertion cylinder 40 is fitted in (in contact with) each latching portion 22, and the vehicle-rear-side surface 46a of each latching protrusion 46 is fitted in (in surface-contact with) the vehicle-front-side surface 22a of each latching portion 22. As a result, each latching protrusion 46 is pressed by each latching portion 22 to the front side of the vehicle, and the vehicle-front-side surface (an end surface) 40a of each insertion cylinder 40 is made to abut against (surface-contact) the vehicle-rear-side surface 18a of each abut-pillar 18.

A predetermined number of pairs (in the present embodiment, four pairs) of elongated plate-shaped rail plates 48 are provided in the outer periphery of the mechanism main body 32, and rail plates 48 in each pair face each other in a direction perpendicular to the longitudinal direction of the vehicle, and each rail plate 48 protrudes perpendicularly from the outer periphery of the mechanism main body 32. As is shown in FIG. 5 in detail, a fitting hole 50 serving as an engagement hole is formed between the rail plates 48 of each pair. A guide inclined surface 52 is formed at a vehicle-front side end of each rail plate 48 at the side of the fitting hole 50, and each guide inclined surface 52 is formed as a planar surface. The width of each fitting hole 50 gradually increases toward the front side of the vehicle due to the guide inclined surfaces 52 of each pair.

When the mirror surface angle adjustment mechanism 30 (mechanism main body 32) is, as is described above, moved close to the assembling portion 14 in the door mirror visor 12 in a facing state, as shown in FIG. 5, each guide inclined surface 52 is guided by each inclined surface 26 due to each fitting hole 50 being moved close to each fitted plate 24, and each engage-plate 24 is fitted into (engaged with) each fitting hole 50 (between the rail plates 48 of each pair).

At the rear side portion of the mechanism main body 32, a quadrilateral plate-shaped mirror holder inner 54 is supported at a central position of the mechanism main body 32. The mirror holder inner 54 is allowed to tilt with respect to the mechanism main body 32.

A mirror portion 56 for visualizing rearward is disposed at a vehicle-rear end portion (an opening portion) in the door mirror visor 12. The mirror portion 56 has a mirror main body 58 (mirror body) at a vehicle rear side portion thereof, and a vehicle rear side region is made viewable by the mirror main body 58. The mirror portion 56 has a mirror holder outer 60 at a vehicle front side portion thereof. The mirror holder outer 60 covers a vehicle front side surface and a peripheral edge of the mirror main body 58.

A vehicle front side portion of the mirror holder outer 60 is claw-engaged with the mirror holder inner 54 (this state is not shown in the drawings), thereby allowing the mirror holder outer 60 (mirror portion 56) to be removably mounted to the mirror holder inner 54 (mirror surface angle adjustment mechanism 30). Accordingly, the mirror surface angle adjustment mechanism 30 holds the mirror portion 56, that is, the door mirror visor 12 supports the mirror portion 56 via the mirror surface angle adjustment mechanism 30. The mirror surface angle adjustment mechanism 30 is driven to tilt the mirror holder inner 54, and the mirror surface angle of the mirror portion 56 (mirror main body 58) is adjusted by the mirror portion 56 being tilted.

Next, operation of the present embodiment will be described.

In the door mirror device 10 for a vehicle having the above-described structure, the mirror holder outer 60 of the mirror portion 56 for visualizing rearward is held by the mirror holder inner 54 of the mirror surface angle adjustment mechanism 30, and the mechanism main body 32 of the mirror surface angle adjustment mechanism 30 is assembled to the assembling portion 14 of the door mirror visor 12 connected to the vehicle body. Thus, the door mirror visor 12 supports the mirror portion 56 via the mirror surface angle adjustment mechanism 30.

The central portion 16a of the engage-member 16 provided in the door mirror visor 12 has elasticity in the surface vertical direction V and has rigidity in the surface parallel direction P. Further, the engagement claw 34 provided in the mirror surface angle adjustment mechanism 30 has the protruding portion 36. Accordingly, as is shown in FIGS. 3A to 3C, when the mirror surface angle adjustment mechanism 30 (mechanism main body 32) is moved to the front of the vehicle (in a direction perpendicular to an opening surface of the door mirror visor 12 and the assembling portion 14) so as to be moved close to the assembling portion 14 in the door mirror visor 12, the protruding portion 36 causes the central portion of the engage-member 16 to elastically deform in the surface vertical direction and then rides over the central portion of the engage-member 16. As a result, elastic deformation of the central portion of the engage-member 16 by the protruding portion 36 is released, and the protruding portion 36 of the engagement claw 34 is engaged with the central portion of the engage-member 16 in the surface parallel direction P. Thus, the mechanism main body 32 of the mirror surface angle adjustment mechanism 30 is assembled to the assembling portion 14 in the door mirror visor 12.

In this way, the engagement claw 34 is engaged with the engage-member 16 due to elastic deformation of the central portion 16a of the engaging portion 16 in the surface vertical direction (by the protruding portion 36, the engagement claw 34 is engaged with the engage-member 16), and the mirror surface angle adjustment mechanism 30 is assembled to the door mirror visor 12. Therefore, the use of a conventional jig or tool equipment can be eliminated, and assembling equipment for assembling the mirror surface angle adjustment mechanism 30 to the door mirror visor 12 can also become unnecessary. Further, elastic deformation of the central portion of the engage-member 16 by the protruding portion 36 of the engagement claw 34 can be achieved by a low power (low load). As a result, an operation of assembling the mirror surface angle adjustment mechanism 30 to the door mirror visor 12 can be facilitated.

Moreover, the central portion 16a of the engage-member 16 has rigidity in the surface parallel direction, as described above. Therefore, by causing the engagement claw 34 to be engaged with the engage-member 16, that is, by causing the central portion to be engaged with the protruding portion 36 in the surface parallel direction, the mirror surface angle adjustment mechanism 30 can be assembled to the door mirror visor 12 by a large assembling force. Accordingly, with only a structure in which the engage-member 16 (the central portion 16a) is formed as a flat plate, and has elasticity in the surface vertical direction and has rigidity in the surface parallel direction, the mirror surface angle adjustment mechanism 30 can be assembled to the door mirror visor 12 by a large assembling force. Further, high-precision management of strength of the engage-member 16, and high-precision formation of shape of the engage-member 16 become unnecessary, thereby facilitating production of the assembling structure for assembling the mirror surface angle adjustment mechanism 30 to the door mirror visor 12.

Further, when the mirror surface angle adjustment mechanism 30 is assembled to the door mirror visor 12, as shown in FIGS. 4A, 4B and 5, the latching portions 22 of each insert protrusion 20 and each engage-plate 24, which are provided in the door mirror visor 12, are respectively engaged with (fitted into) each insertion hole 44 (in the insertion cylinder 40) and each fitting hole 50 (formed the between rail plates 48), which are provided in the mirror surface angle adjustment mechanism 30. As the result, the protruding portion 36 of the engagement claw 34 can be guided to the engage-member 16 (the central portion 16a) and the protruding portion 36 of the engagement claw 34 can be reliably engaged with the engage-member 16 (the central portion 16a). Therefore, the mirror surface angle adjustment mechanism 30 (mechanism main body 32) can be reliably assembled to the door mirror visor 12.

Further, the mirror surface angle adjustment mechanism 30 (mechanism main body 32) can also be positioned in the door mirror visor 12, and looseness (backlash) of the mirror surface angle adjustment mechanism 30 (mechanism main body 32) with respect to the door mirror visor 12 in all directions perpendicular to the longitudinal direction of the vehicle (each insertion hole 44, each fitting hole 50, each insert protrusion 20, and each engage-plate 24) can be prevented.

As shown in FIGS. 4A and 4B, when the mirror surface angle adjustment mechanism 30 is assembled to the door mirror visor 12, the vehicle-rear-side surface 46b of each latching protrusion 46 provided in each of the insertion cylinders 40 of the mirror surface angle adjustment mechanism 30 is pressed toward the front (toward the door mirror visor 12) by the vehicle-front-side surface 22a of each latching portion 22 provided in each insert protrusion 20 of the door mirror visor 12. Therefore, the vehicle-front-side surface 40a of each insertion cylinder 40 is made to abut against the vehicle-rear-side surface 18a of each abut-pillar 18 provided in the door mirror visor 12. Accordingly, looseness of the mirror surface angle adjustment mechanism 30 (mechanism main body 32) with respect to the door mirror visor 12 in the longitudinal direction of the vehicle body (in a direction to the door mirror visor 12 and in a direction opposite thereof) can be prevented.

Thus, when the mirror surface angle adjustment mechanism 30 is assembled to the door mirror visor 12, even if the vehicle-rear-side surface 36a of the protruding portion 36 in the engagement claw 34 is not made to abut against a vehicle-front-side surface 16f of the engage-member 16 central portion, looseness of the mirror surface angle adjustment mechanism 30 in the longitudinal direction of the vehicle can be prevented. As a result, a space can be formed between the vehicle-rear-side surface 36a of the protruding portion 36 and the vehicle-front-side surface 16f of the engage-member 16 central portion, and the protruding portion 36 can reliably ride over the engage-member 16. Further, therefore, it is not necessary to form the engage-member 16 and the engagement claw 34 (including the protruding portion 36) into high-accurate sizes, and the engage-member 16 and the engagement claw 34 can be simply formed.

SECOND EMBODIMENT

Figure 6A:
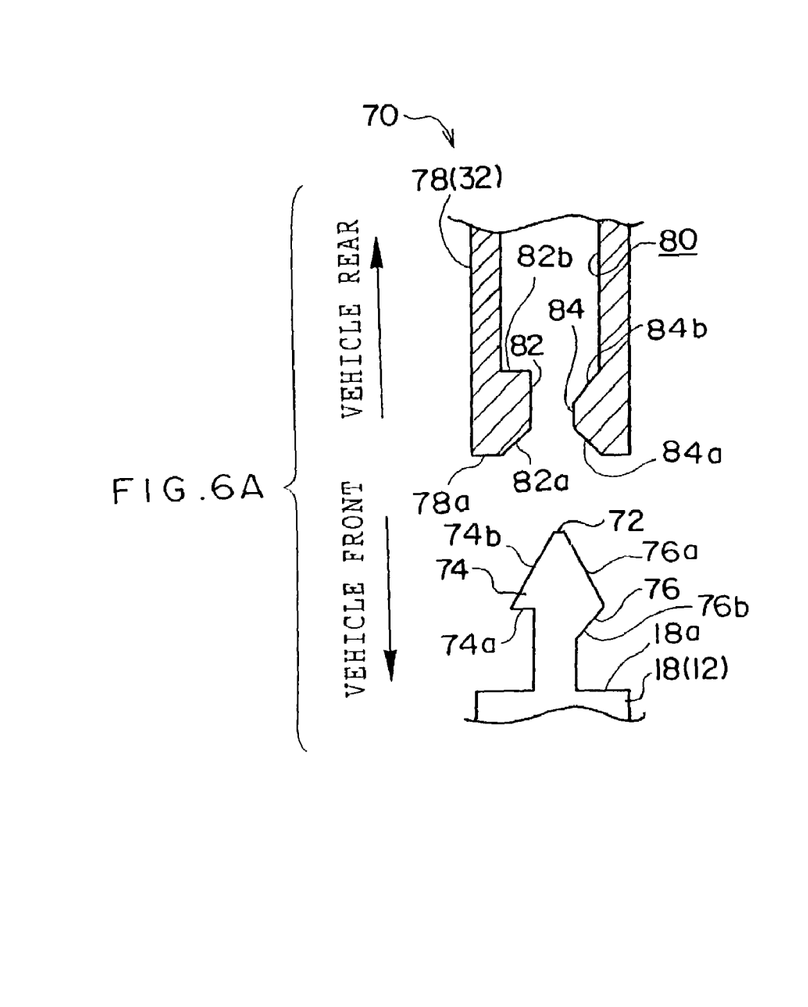
FIG. 6A is a partially cutaway side view showing a manner in which the insert protrusion is inserted in the insertion cylinder.
Figure 6B:
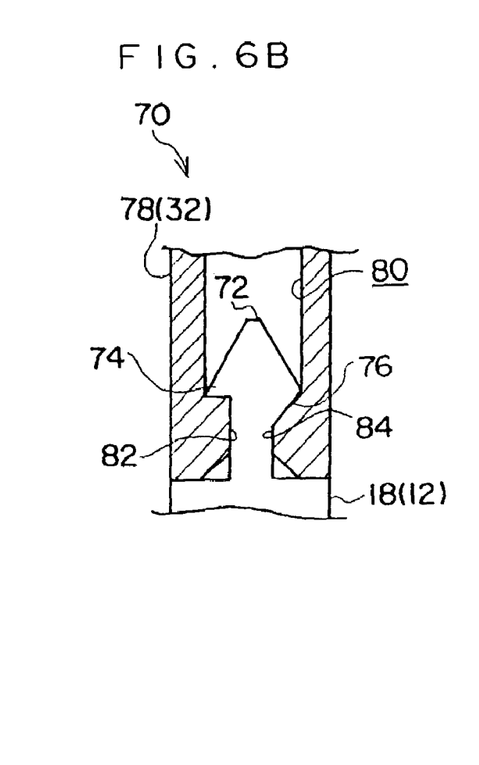
FIG. 6B is a partially cutaway side view showing a state in which the insert protrusion is inserted in the insertion cylinder.

FIGS. 6A and 6B each show a partially cut-away side view of a door mirror device 70 for a vehicle according to a second embodiment of the present invention to which the mirror device for a vehicle of the present invention is applied.

The door mirror device 70 for a vehicle according to the second embodiment is structured substantially in the same manner as in the door mirror device 10 for a vehicle according to the first embodiment except for the following structures.

The predetermined number of engage-members 16 are not provided in the outer periphery of the assembling portion 14 in the door mirror visor 12.

A flat plate-shaped insert protrusion 72 serving as an engagement claw and an engagement protrusion is provided, in place of the insert protrusion 20 of the above-described first embodiment, on a vehicle-rear-side surface 18a of each abut-pillar 18 in the door mirror visor 12. Each insert protrusion 72 has rigidity and protrudes from each abut-pillar 18 to the rearward of the vehicle.

An engaging portion 74 serving as a protruding portion is formed at a vehicle-rear-side end portion of each insert protrusion 72 and protrudes from each insert protrusion 72 in a direction perpendicular to the longitudinal direction of the vehicle. Each engaging portion 74 protrudes form each insert protrusion 72 so as to have a triangular or trapezoidal cross-sectional configuration. A vehicle-front-side surface 74a of each engaging portion 74 is formed as a planar surface perpendicular to the longitudinal direction of the vehicle, and a vehicle-rear-side surface 74b thereof is formed as a planar inclined surface.

A latching portion 76 is formed at the vehicle-rear-side end portion of each insert protrusion 72, and protrudes from each insert protrusion 72 both in a direction perpendicular to the longitudinal direction of the vehicle and in a direction opposite to that of each engaging portion 74. Each latching portion 76 protrudes from each insert protrusion 72 so as to have a triangular or trapezoidal cross-sectional configuration. A vehicle-front-side surface 76a and vehicle-rear-side surface 76b of each latching portion 76 are each formed as a planar inclined surface.

A predetermined number of engagement claws 34 of the above-described first embodiment are not provided in the outer periphery of the mechanism main body 32 of the mirror surface angle adjustment mechanism 30.

A substantially cylindrical insertion cylinder 78 serving as an engage-member is formed, in place of the insertion cylinder 40 of the above-described first embodiment, on a vehicle-front-side surface of each protruding plate 38 of the mechanism main body 32 so as to be formed integrally with the mechanism main body 32. Each insertion cylinder 78 protrudes from each protruding plate 38 toward the front of the vehicle. A pair of slits 42 is formed, in the same manner as in the first embodiment, at a vehicle-front end of each insertion cylinder 78, and the slits 42 in each pair face each other. As a result, each insertion cylinder 78 has elasticity in a direction in which the engaging portion 74 of each insert protrusion 72 protrudes and in a direction in which the latching portion 76 protrudes (i.e., a direction perpendicular to the longitudinal direction of the vehicle), and also has rigidity in the axial direction thereof (i.e., the longitudinal direction of the vehicle). Further, the interior of each insertion cylinder 78 is formed as an insertion hole 80 serving as an engagement hole.

An engagement protrusion 82 having rigidity is formed at a vehicle-front-side end of an internal peripheral surface of each insertion cylinder 78. Each engagement protrusion 82 protrudes from the internal peripheral surface of each insertion cylinder 78 in a direction perpendicular to the longitudinal direction of the vehicle. Each engagement protrusion 82 protrudes from the internal peripheral surface of each insertion cylinder 78 so as to have a trapezoidal or triangular cross-sectional configuration. A vehicle-front-side surface 82a of each engagement protrusion 82 is formed as a planar inclined surface and a vehicle-rear-side surface 82b thereof is formed as a planar vertical surface perpendicular to the longitudinal direction of the vehicle.

A latching protrusion 84 having rigidity is formed at the vehicle-front-side end of an inner peripheral surface of each insertion cylinder 78. Each latching protrusion 84 protrudes from the inner peripheral surface of each insertion cylinder 78 in a direction perpendicular to the longitudinal direction of the vehicle body and also in a direction opposite to that of the engagement protrusion 82. Each latching protrusion 84 protrudes from the inner peripheral surface of each insertion cylinder 78 so as to have a trapezoidal or triangular cross-sectional configuration. A vehicle-front-side surface 84a and a vehicle-rear-side surface 84b of each latching protrusion 84 are each formed as a planar inclined surface.

As is shown in FIG. 6A, when each insertion cylinder 78 is moved close to each insert protrusion 72 in such a manner that the mirror surface angle adjustment mechanism 30 (mechanism main body 32) is moved close to the assembling portion 14 in the door mirror visor 12 in a facing state, the vehicle-front-side surface 82a of each engagement protrusion 82 is guided to the vehicle-rear-side surface 74b of each engaging portion 74, and the vehicle-front-side surface 84a of each latching protrusion 84 is guided to the vehicle-rear-side surface 76b of each latching portion 76, thereby allowing each insert protrusion 72 to be inserted in each insertion hole 80 (insertion cylinder 78).

Further, the vehicle-front-side surface 82a of each engagement protrusion 82 is pushed by the vehicle-rear-side surface 74a of each engaging portion 74 to cause each insertion cylinder 78 to elastically deform (deflect) in a direction perpendicular to the longitudinal direction of the vehicle, therefore each engaging portion 74 rides over (passes over) each engagement protrusion 82. As a result, as is shown in FIG. 6B, elastic deformation of each insertion cylinder 78 due to each engaging portion 74 is released due to the elastic force (restoring force), and the inner peripheral surface of each insertion cylinder 78 is fitted into (contacts) the each engaging portion 74, and the vehicle-front-side surface 74a of each engaging portion 74 is disposed rear direction of the vehicle with respect to the vehicle-rear-side surface 82b of each engagement protrusion 82. As a result, the engaging portion 74 of each insert protrusion 72 is engaged with (latched with) the engagement protrusion 82 of each insertion cylinder 78 in the longitudinal direction of the vehicle, and movement of the mirror surface angle adjustment mechanism 30 to rearward of the vehicle is prevented, thereby resulting in the mirror surface angle adjustment mechanism 30 being assembled to the door mirror visor 12.

At the same time, the vehicle-front-side surface 84a of each latching protrusion 84 is pushed by the vehicle-rear-side surface 76b of each latching portion 76 to cause each insertion cylinder 78 to elastically deform (deflect) in a direction perpendicular to the longitudinal direction of the vehicle, therefore each latching portion 76 rides over (passes over) each latching protrusion 84. As a result, as is shown in FIG. 6B, elastic deformation of each insertion cylinder 78 by each latching portion 76 is released due to the elastic force (restoring force), and the inner peripheral surface of each insertion cylinder 78 is fitted into (contacts) each latching protrusion 76, and the vehicle-front-side surface 76a of each latching portion 76 is fitted into (surface-contacts) the vehicle-rear-side surface 84b of each latching protrusion 84. As a result, each latching protrusion 84 is pressed toward the vehicle front by each latching portion 76, and the vehicle-front-side surface (end surface) 78a of each insertion cylinder 78 is made to abut against (surface-contact) the vehicle-rear-side surface 18a of each abut-pillar 18.

Next, operation of the present embodiment will be described.

In the door mirror device 70 for a vehicle having the aforementioned structure as well, in the same manner as in the first embodiment, the mirror holder outer 60 of the mirror portion 56 for visualizing rearward is held by the mirror holder inner 54 of the mirror surface angle adjustment mechanism 30, and the mechanism main body 32 of the mirror surface angle adjustment mechanism 30 is assembled to the assembling portion 14 of the door mirror visor 12 connected to the vehicle body, thereby resulting in the door mirror visor 12 supporting the mirror portion 56 via the mirror surface angle adjustment mechanism 30.

The insertion cylinder 78 provided in the mechanism main body 32 of the mirror surface angle adjustment mechanism 30 has elasticity in a direction perpendicular to the longitudinal direction of the vehicle, and the insertion cylinder 78, particularly, the engagement protrusion 82, has rigidity to the longitudinal direction of the vehicle body. Further, the insert protrusion 72 provided in the door mirror visor 12 has the engaging portion 74. Accordingly, as is shown in FIGS. 6A and 6B, when the insert protrusion 72 is inserted in the insertion hole 80 in the insertion cylinder 78 by moving the mirror surface angle adjustment mechanism 30 (mechanism main body 32) to the vehicle front direction (in a direction perpendicular to an opening surface of the door mirror visor 12 and the assembling portion 14) so as to move close to the assembling portion 14 in the door mirror visor 12, the engaging portion 74 presses the engagement protrusion 82 to cause the insertion cylinder 78 to elastically deform in a direction perpendicular to the longitudinal direction of the vehicle, and the engaging portion 74 rides over the engagement protrusion 82. As a result, elastic deformation of the insertion cylinder 78 by the engaging portion 74 is released. Thus, the insert protrusion 72 (the engaging portion 74) is engaged with the engagement protrusion 82 of the insertion cylinder 78 in the longitudinal direction of the vehicle, thereby resulting in the mechanism main body 32 of the mirror surface angle adjustment mechanism 30 being assembled to the assembling portion 14 in the door mirror visor 12.

In this manner, the insert protrusion 72 is engaged with the insertion cylinder 78 due to the elastic deformation of the insertion cylinder 78 by the engaging portion 74 in the direction perpendicular to the longitudinal direction of the vehicle, and the mirror surface angle adjustment mechanism 30 is assembled to the door mirror visor 12. Therefore, the use of a conventional jig or tool can be eliminated, and assembling equipment for assembling the mirror surface angle adjustment mechanism 30 to the door mirror visor 12 can also become unnecessary. Further, elastic deformation of the insertion cylinder 78 by the engaging portion 74 of the insert protrusion 72 can be achieved by a low power (low load). As a result, an operation of assembling the mirror surface angle adjustment mechanism 30 to the door mirror visor 12 can be facilitated.

Furthermore, the engagement protrusion 82 of the insertion cylinder 78 has rigidity in the longitudinal direction of the vehicle, as is described above. Accordingly, by engaging the insert protrusion 72 with the engagement protrusion 82 of the insertion cylinder 78 at the engaging portion 74 in the longitudinal direction of the vehicle, the mirror surface angle adjustment mechanism 30 can be assembled to the door mirror visor 12 by a large assembling force. For this reason, with only the structure in which the pair of slits 42 are provided and the engagement protrusion 82 is provided such that the insertion cylinder 78 has elasticity to the direction perpendicular to the longitudinal direction of the vehicle and has, at the engagement protrusion 82, rigidity to the longitudinal direction of the vehicle, the mirror surface angle adjustment mechanism 30 can be assembled to the door mirror visor 12 by a large assembling force. High-precision management of the strength of the insertion cylinder 78 or high-precision formation of the shape of the insertion cylinder 78 becomes unnecessary, thereby facilitating production of the structure for assembling the mirror surface angle adjustment mechanism 30 to the door mirror visor 12.

Further, when the mirror surface angle adjustment mechanism 30 is assembled to the door mirror visor 12, the latching portion 76 of each insert protrusion 72 and each engage-plate 24, which are provided in the door mirror visor 12, are respectively engaged with (fitted into) each insertion hole 80 (each insertion cylinder 78) and each fitting hole 50 (between each pair of rail plates 48), which are provided in the mechanism main body 32 of the mirror surface angle adjustment mechanism 30. Accordingly, the engaging portion 74 of the insert protrusion 72 is guided to and can be reliably engaged with the engagement protrusion 82 of the insertion cylinder 78, and the mirror surface angle adjustment mechanism 30 (mechanism main body 32) can be reliably assembled to the door mirror visor 12.

Furthermore, the mirror surface angle adjustment mechanism 30 (mechanism main body 32) can be positioned in the door mirror visor 12, and looseness of the mirror surface angle adjustment mechanism 30 (mechanism main body 32) with respect to the door mirror visor 12 in all directions which are perpendicular to the longitudinal direction of the vehicle (perpendicular to each insertion hole 80, each fitting hole 50, each insert protrusion 72, and each engage-plate 24) can be prevented.

When the mirror surface angle adjustment mechanism 30 is assembled to the door mirror visor 12, the vehicle-front-side surface 76a of each latching portion 76 provided in each insert protrusion 72 of the door mirror visor 12 presses the vehicle-rear-side surface 84b of each latching protrusion 84 provided in each insertion cylinder 78 of the mirror surface angle adjustment mechanism 30 toward the vehicle front direction (toward the door mirror visor 12), thereby causing the vehicle-front-side surface 78a of each insertion cylinder 78 to abut against the vehicle-rear-side surface 18a of each abut-pillar 18 provided in the door mirror visor 12. For this reason, looseness of the mirror surface angle adjustment mechanism 30 (mechanism main body 32) with respect to the door mirror visor 12 in the longitudinal direction of the vehicle (to the door mirror visor 12 direction and to the opposite direction of the door mirror visor 12 direction) can be prevented.

Accordingly, when the mirror surface angle adjustment mechanism 30 is assembled to the door mirror visor 12, even if the vehicle-front-side surface 74a of the engaging portion 74 in the insert protrusion 72 is not made to abut against the vehicle-rear-side surface 82b of the engagement protrusion 82 in the insertion cylinder 78, looseness of the mirror surface angle adjustment mechanism 30 in the longitudinal direction of the vehicle can be prevented. As a result, a space can be formed between the vehicle-front-side surface 74a of the engaging portion 74 and the vehicle-rear-side surface 82b of the engagement protrusion 82, therefore, the engaging portion 74 can reliably ride over the engagement protrusion 82. Further, it is not necessary to form the insertion cylinder 78 (including the engagement protrusion 82) and the insert protrusion 72 (including the engaging portion 74)

into high-accurate sizes, and the insertion cylinder 78 and the insert protrusion 72 can be simply formed.

The vehicle-front-side surface 74a of the engaging portion 74 in the insert protrusion 72 and the vehicle-rear-side surface 82b of the engagement protrusion 82 in the insertion cylinder 78 are each formed as a vertical surface which is perpendicular to the longitudinal direction of the vehicle. Accordingly, when the mirror surface angle adjustment mechanism 30 is assembled to the door mirror visor 12, the vehicle-rear-side surface of the engagement protrusion 82 is caught by the vehicle-front-side surface of the engaging portion 74, thereby reliably preventing the vehicle-rear-side surface (inclined surface) 84b of the engagement protrusion 84 in the insertion cylinder 78 from sliding on the vehicle-front-side surface (inclined surface) 76a of the latching portion 76 in the insert protrusion 72. As a result, with only the vehicle-front-side surface 74a of the engaging portion 74 and the vehicle-rear-side surface 82b of the engagement protrusion 82 being each formed as a vertical surface perpendicular to the longitudinal direction of the vehicle, a load which is necessary to release engagement (assembling) of the engagement protrusion 82 and the latching protrusion 84 of the insertion cylinder 78 with the engaging portion 74 and the latching portion 76 of the insert protrusion 72 can be reliably made larger than a load for engaging (assembling) the engagement protrusion 82 and the latching protrusion 84 of the insertion cylinder 78 with the engaging portion 74 and the latching portion 76 of the insert protrusion 72.

Further, in order that the mirror surface angle adjustment mechanism 30 is assembled to the door mirror visor 12 in the aforementioned first embodiment, in addition to a load required for engagement of the pairs of latching portions 22 in the predetermined number of insert protrusions 20 with the pairs of latching protrusions 46 in the predetermined number of insertion cylinders 40, a load required for engagement between the predetermined number of engage-members 16 and the predetermined number of engagement claws 34 is needed. On the other hand, in the second embodiment, in order to assemble the mirror surface angle adjustment mechanism 30 to the door mirror visor 12, only a load required for engagement between the insert protrusions 72 and the insertion cylinders 78, that is, between the engaging portion 74 and the latching portion 76 in each of the predetermined number of insert protrusions 72 and the engagement protrusion 82 and the latching protrusion 84 in each of the predetermined number of insertion cylinders 78, is needed, thereby allowing a total load required for assembling the mirror surface angle adjustment mechanism 30 to the door mirror visor 12 to be reduced.

In the second embodiment, the predetermined number of engage-members 16 and the predetermined number of engagement claws 34, which are provided in the first embodiment, are not provided, but the predetermined number of engage-members and the predetermined number of engagement claws as in the first embodiment may also be provided in the second embodiment as well.

Further, in the aforementioned first and second embodiments, the insert protrusions 20 and 72, and the engage-plates 24 are provided in the door mirror visor 12, and the insertion holes 44 and 80 (the insertion cylinders 40 and 78) and the fitting holes 50 (pairs of rail plates 48) are provided in the mirror surface angle adjustment mechanism 30. However, there may also be used a structure in which the insert protrusions and/or the engage-plates (engagement protrusions) are provided in the mirror surface angle adjustment mechanism (holding member) and the insertion holes and/or the fitting holes (engagement holes) are provided in the door mirror visor (supporting member).

Still further, in the aforementioned first and second embodiments, the door mirror visor 12 is structured so as to support the mirror portion 56 via the mirror surface angle adjustment mechanism 30. However, a door mirror visor (supporting member) may also be structured so as to directly support a mirror (or only a mirror main body). In this case as well, the same functions and effects as those of the embodiments of the present invention can be obtained, by providing the structure in which, for example, the engage-member of the present invention is provided in one of the door mirror visor and the mirror, and the engagement claw of the present invention is provided in the other of the door mirror visor and the mirror.

In addition, in the aforementioned first and second embodiments, the mirror device for a vehicle according to the present invention is applied to the door mirror devices 10 and 70 for a vehicle, but it may also be applied to a fender mirror device for a vehicle, an inner mirror device for a vehicle, or the like.

In the mirror device for a vehicle according to one aspect of the present invention, due to elastic deformation of the engage-member by the protruding portion of the engagement claw in the first direction, the engagement claw is engaged with the engage-member and the holding member is assembled to the supporting member. Therefore, the use of equipment for assembling the holding member to the supporting member can be eliminated. Further, with only a structure in which the engage-member has elasticity to the first direction and has rigidity to the second direction, the holding member can be assembled to the supporting member by a large assembling force due to engagement of the protruding portion with the engage-member in the second direction, and production of a structure for assembling the holding member to the supporting member can be facilitated.

Further, in the mirror device for a vehicle according to another aspect of the present invention, when the holding member is assembled to the supporting member, the engagement protrusion is fitted in the fitting hole. Therefore, not only the engagement claw is reliably engaged with the engage-member to allow reliable assembling of the holding member to the supporting member, but also the holding member can be positioned in the supporting member. Further, looseness of the holding member with respect to the supporting member in a direction perpendicular to the fitting hole and the engagement protrusion can be prevented.

Moreover, in the mirror device for a vehicle according to still another aspect of the present invention, when the holding member is assembled to the supporting member, the supporting member presses the holding member toward the supporting member to allow the holding member to abut against the supporting member. Therefore, looseness of the holding member to the supporting member to the supporting member direction and to a direction opposite the supporting member direction can be prevented.

What is claimed is:

1. A mirror device for a vehicle, having a mirror angle adjustment mechanism which holds and selectively tilts a mirror for a vehicle operator for said operator to visualize rearward, and a door mirror visor which is connected to a vehicle body and which is assembled with said minor angle adjustment mechanism, said door mirror visor supporting the mirror via said mirror angle adjustment mechanism, said device comprising:
an engage-member provided in one of said mirror angle adjustment mechanism or said door minor visor, said engage-member having elasticity in a first direction and having rigidity in a second direction; and
an engagement claw provided in the other of said mirror angle adjustment mechanism or said door mirror visor, the engagement claw having a protruding portion, an engagement hole provided in one of said mirror angle adjustment mechanism or said door mirror visor, and an engagement protrusion provided in the other of said mirror angle adjustment mechanism or said door mirror visor, said engagement protrusion being engaged with said engagement hole when said mirror angle adjustment mechanism is assembled to said door mirror visor, wherein said mirror angle adjustment mechanism is assembled to said door mirror visor by the protruding portion of said engagement claw being engaged with said engage-member in the second direction due to that the protruding portion causes said engage-member to elastically deform in the first direction, and passes over said engage-member.

2. A mirror device for a vehicle according to claim 1, wherein when said mirror angle adjustment mechanism is assembled to said door mirror visor, said door mirror visor presses said mirror angle adjustment mechanism toward said door minor visor, thereby allowing said mirror angle adjustment mechanism to abut on said door mirror visor.

3. A mirror device for a vehicle, having a mirror angle adjustment mechanism which holds and selectively tilts a mirror for a vehicle operator for said operator to visualize rearward; and a door mirror visor which is connected to a vehicle body and which is assembled wit said mirror angle adjustment mechanism, said door mirror visor supporting the mirror via said mirror angle adjustment mechanism, said device comprising:

an engage-member provided in one of said mirror angle adjustment mechanism or said door mirror visor, said engage-member having elasticity in a first direction and having rigidity in a second direction; and an engagement claw provided in the other of said mirror angle adjustment mechanism or said door mirror visor, wherein said mirror angle adjustment mechanism is assembled to said door mirror visor by said engagement claw being engaged with said engage-member in the second direction after said engage-member is elastically deformed by said engagement claw in the first direction, and wherein the first direction is a direction perpendicular to an assembling direction of said mirror angle adjustment mechanism and said door mirror visor, and the second direction is parallel to the assembling direction.

4. A mirror device for a vehicle according to claim 3, wherein said engage-member is formed such that a plate-shape member is bent in a substantially U-form, and a central portion of the plate-shape member is engaged with a protrusion formed on said engagement claw.

5. A mirror device for a vehicle according to claim 3, further comprising:

an engagement hole provided in one of said mirror angle adjustment mechanism or said door mirror visor; and an engagement protrusion provided in the other of said mirror angle adjustment mechanism and said door mirror visor, said engagement protrusion being engaged with said engagement hole when said mirror angle adjustment mechanism is assembled to said door mirror visor.

6. A mirror device for a vehicle according to claim 5, wherein said engagement protrusion has protrusions on a tip end thereof, and said engagement hole is a tube-shape.

7. A mirror device for a vehicle according to claim 5, wherein said engagement protrusion is a plate-shape member, and said engagement hole is formed by a pair of plate-shape members.

8. A mirror device for a vehicle according to claim 5, wherein said engage-member and said engagement hole are formed on a single member.

9. A mirror device for a vehicle according to claim 8, wherein the single member is a tube-shape member, and a pair of slits are formed on the tube-shape member so as to have elasticity in the first direction.

10. A mirror device for a vehicle according to claim 5, wherein said engagement claw and said engagement protrusion are formed on a single member.

11. A mirror device for a vehicle according to claim 10, wherein the single member is a protruding member having protrusions on a tip end thereof.

12. A mirror device for a vehicle according to claim 3, wherein a predetermined gap is formed between said engagement claw and said engage-member in a state in which said engagement protrusion is engaged with said engagement hole.

13. A mirror device for a vehicle, having a mirror angle adjustment mechanism which holds and selectively tilts a mirror for a vehicle operator for said operator to visualize rearward, and a door mirror visor which is connected to a vehicle body and which is assembled with said mirror angle adjustment mechanism, said door mirror visor supporting the mirror via said mirror angle adjustment mechanism, said device comprising:

an engage-member provided in one of said mirror angle adjustment mechanism or said door mirror visor, said engage-member having elasticity in a first direction and having rigidity in a second direction; and an engagement claw provided in the other of said mirror angle adjustment mechanism or said door mirror visor, the engagement claw having a protruding portion, wherein said engage-member in the second direction due to that the protruding portion causes said engage-member to elastically deform in the first direction, and passes over said engage-member, wherein a plurality of said engage-members are provided in the one of said mirror angle adjustment mechanism or said door mirror visor so as to be arranged in a circumferential manner at substantially same intervals therebetween, end a plurality of said engagement claws are provided in the other of said mirror angle adjustment mechanism or said door mirror visor so as to be arranged in a circumferential manner at substantially same intervals therebetween.

14. A mirror device for a vehicle, having a mirror angle adjustment mechanism which holds and selectively tilts a mirror for a vehicle operator for said operator to visualize rearward; and a door mirror visor which is connected to a vehicle body and which is assembled with said mirror angle adjustment mechanism, said door mirror visor supporting the mirror via said mirror angle adjustment mechanism, said device comprising:

an engage-member provided in one of said mirror angle adjustment mechanism or said door mirror visor, said engage-member having elasticity in a first direction and having rigidity in a second direction; and an engagement claw provided in the other of said mirror angle adjustment mechanism or said door mirror visor, wherein said mirror angle adjustment mechanism is assembled to said door mirror visor by said engagement claw being engaged with said engage-member in the second direction after said engage-member is elastically deformed by said engagement claw in the first direction, and wherein said engage-member is a substantially U-shaped member in a view seen from the second direction, a central portion thereof being elastically deformable in the first direction, and said mirror angle adjustment mechanism is assembled to said door mirror visor by a protrusion formed on said engagement claw being engaged with the central portion of said engage-member in the second direction after the central portion of said engagement-member is elastically deformed by the protrusion of said engagement claw in the direction.

15. A mirror device for a vehicle, having a mirror angle adjustment mechanism which holds and selectively tilts a mirror for a vehicle operator for said operator to visualize rearward; and a door mirror visor which is connected to a vehicle body and which is assembled with said mirror angle adjustment mechanism, said door mirror visor supporting the mirror via said mirror angle adjustment mechanism, said device comprising:

an engage-member provided in one of said mirror angle adjustment mechanism or said door mirror visor, said engage-member having elasticity in a first direction and having rigidity in a second direction; and an engagement claw provided in the other of said mirror angle adjustment mechanism or said door mirror visor, wherein said mirror angle adjustment mechanism is assembled to said door mirror visor by said engagement claw being engaged with said engage-member in the second direction after said engage-member is elastically deformed by said engagement claw in the first direction, and wherein a plurality of said engage-members are provided in the one of said mirror angle adjustment mechanism or said door mirror visor so as to be arranged in a circumferential manner at substantially same intervals therebetween, and a plurality of said engagement claws are provided in the other of said mirror angle adjustment mechanism or said door mirror visor so as to be arranged in a circumferential manner at substantially saint intervals therebetween.

16. A mirror device for a vehicle, having a mirror angle adjustment mechanism which holds ad selectively tilts a mirror for a vehicle operator for said operator to visualize rearward; and a door mirror visor which is connected to a vehicle body and which is assembled with said mirror angle adjustment mechanism, said door mirror visor supporting the mirror via said mirror angle adjustment mechanism, said device comprising:

an engage-member provided in one of said mirror angle adjustment mechanism or said door mirror visor, said engage-member having elasticity in a first direction and having rigidity in a second direction; and an engagement claw provided in the other of said mirror angle adjustment mechanism or said door mirror visor, wherein said mirror angle adjustment mechanism is assembled to said door mirror visor by said engagement claw being engaged with said engage-member in the second direction after said engage-member is elastically deformed by said engagement claw in the first direction, wherein said engage-member is formed such that a plate-shape member is bent in substantially U-form, and a central portion of the plate-shape member is engaged with a protrusion formed on said engagement claw.

* * * * *